United States Patent
Sorrentino et al.

(10) Patent No.: US 9,780,972 B2
(45) Date of Patent: *Oct. 3, 2017

(54) METHODS AND ARRANGEMENTS FOR CHANNEL ESTIMATION

(71) Applicant: Telefonaktiebolaget LM Ericsson (publ), Stockholm (SE)

(72) Inventors: Stefano Sorrentino, Solna (SE); George Jongren, Stockholm (SE)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 0 days.

This patent is subject to a terminal disclaimer.

(21) Appl. No.: 15/273,135

(22) Filed: Sep. 22, 2016

(65) Prior Publication Data

US 2017/0012801 A1  Jan. 12, 2017

Related U.S. Application Data

(63) Continuation of application No. 14/581,032, filed on Dec. 23, 2014, now Pat. No. 9,456,371, which is a
(Continued)

(51) Int. Cl.
*H04W 56/00* (2009.01)
*H04L 25/02* (2006.01)
(Continued)

(52) U.S. Cl.
CPC ........ *H04L 25/0204* (2013.01); *H04L 5/0048* (2013.01); *H04L 43/028* (2013.01);
(Continued)

(58) Field of Classification Search
CPC ........... H04W 56/001; H04W 56/0015; H04W 56/002; H04W 56/0095
See application file for complete search history.

(56) References Cited

U.S. PATENT DOCUMENTS 8,547,922 B2   10/2013  Yu et al.
8,964,632 B2 *  2/2015  Sorrentino .......... H04L 25/0204
                                                370/324
(Continued)

FOREIGN PATENT DOCUMENTS

JP   2010-522499 A    7/2010
WO   2010/097758 A1   9/2010
(Continued)

OTHER PUBLICATIONS

3GPP TS 36.211 V10.2.0 (Jun. 2011), Technical Specification; "3rd Generation Partnership Project; Technical Specification Group Radio Access Network; Evolved Universal Terrestrial Radio Access (E-UTRA); Physical Channels and Modulation (Release 10)"; 4 Advanced LTE, 3 GPP; Jun. 2011; pp. 1-103; Valbonne, France.
(Continued)

*Primary Examiner* — Hoon J Chung
(74) *Attorney, Agent, or Firm* — Patent Portfolio Builders PLLC

(57) ABSTRACT

Some embodiments provide a method for channel estimation in a wireless device. According to the method, the wireless device obtains (1010) an indication that a set of antenna ports, or antenna port types, share at least one channel property. The wireless device then estimates (1020) one or more of the shared channel properties based at least on a first reference signal received from a first antenna port included in the set, or having a type corresponding to one of the types in the set. Furthermore, the wireless device performs (1030) channel estimation based on a second reference signal received from a second antenna port included in the set, or having a type corresponding to one of the types in the set, wherein the channel estimation is performed using at least the estimated channel properties.

19 Claims, 12 Drawing Sheets

Related U.S. Application Data continuation of application No. 13/422,298, filed on Mar. 16, 2012, now Pat. No. 8,964,632.

(60) Provisional application No. 61/594,566, filed on Feb. 3, 2012.

(51) Int. Cl.
| | |
|---|---|
| *H04W 24/08* | (2009.01) |
| *H04L 5/00* | (2006.01) |
| *H04L 12/26* | (2006.01) |
| *H04L 27/26* | (2006.01) |
| *H04W 16/32* | (2009.01) |
| *H04W 88/02* | (2009.01) |

(52) U.S. Cl.
CPC ......... *H04W 24/08* (2013.01); *H04W 56/001* (2013.01); *H04W 56/0095* (2013.01); *H04L 27/2601* (2013.01); *H04W 16/32* (2013.01); *H04W 88/02* (2013.01)

(56) References Cited

U.S. PATENT DOCUMENTS

| | | | |
|---|---|---|---|
| 9,456,371 B2* | 9/2016 | Sorrentino | .......... H04L 25/0204 |
| 2010/0220800 A1 | 9/2010 | Erell et al. | |
| 2011/0176517 A1 | 7/2011 | Hu et al. | |
| 2013/0028217 A1 | 1/2013 | Samasu et al. | |
| 2013/0039284 A1 | 2/2013 | Mariner et al. | |
| 2013/0114522 A1 | 5/2013 | Frenne et al. | |
| 2013/0176964 A1 | 7/2013 | Pan et al. | |
| 2013/0201840 A1 | 8/2013 | Sorrentino et al. | |
| 2016/0073383 A1 | 3/2016 | Han et al. | |

FOREIGN PATENT DOCUMENTS

| | | |
|---|---|---|
| WO | 2011/017973 A1 | 2/2011 |
| WO | 2011/083417 A2 | 7/2011 |
| WO | 2011/088403 A1 | 7/2011 |
| WO | 2011/125300 A1 | 10/2011 |

OTHER PUBLICATIONS

3GPP TS 36.212 V10.2.0 (Jun. 2011), Technical Specification; "3rd Generation Partnership Project; Technical Specification Group Radio Access Network; Evolved Universal Terrestrial Radio Access (E-UTRA); Multiplexing and channel coding (Release 10)"; 4 Advanced LTE, 3 GPP; Jun. 2011; pp. 1-178; Valbonne, France.

3GPP TS 36.213 V10.2.0 (Jun. 2011), Technical Specification; "3rd Generation Partnership Project; Technical Specification Group Radio Access Network; Evolved Universal Terrestrial Radio Access (E-UTRA); Physical layer procedures (Release 10)"; 4 Advanced LTE, 3 GPP; Jun. 2011; pp. 1-120; Valbonne, France.

International Preliminary Report on Patentability in corresponding International Application No. PCT/SE2013/050081, mailed Jun. 3, 2014.

International Search Report issued in corresponding International application No. PCT/SE2013/050081, date of mailing May 22, 2013.

Written Opinion of the International Searching Authority issued in corresponding International application No. PCT/SE2013/050081, date of mailing May 22, 2013.

Motorola Mobility, "Scenario and Modeling Discussion for DL-MIMO Enhancement," 3GPP Draft, R1-112444, 3rd Generation Partnership Project (3GPP), Mobile Competence Centre, 650 Route des Lucioles, F-06921 Sophia-Antipolis Cedex, France, TSG RAN WG1 #66, Athens, Greece, Aug. 22-26, 2011, XP050537545.

ST-Ericsson et al., "Geographically separated antenna and impact on CSI estimation," 3GPP Draft, R4-120679, Geographically Separated Antennas v2, 3rd Generation Partnership Project (3GPP), Mobile Competence Centre, 650 Route des Lucioles, F-06921 Sophia-Antipolis Cedex, France, TSG RAN WG4 meeting #62, Dresden, Germany, Feb. 6-9, 2012, XP050568289.

Ericsson et al., "Discussion on Antenna Ports Co-location," 3GPP Draft, R1-121026 Ports Colocation, 3rd Generation Partnership Project (3GPP), Mobile Competence Centre, 650 Route des Lucioles, F-06921 Sophia-Antipolis Cedex, France, TSG RAN WG4, Jeju, Korea, Mar. 26-30, 2012, XP050599267.

Ericsson et al., "Discussion on Antenna Ports Co-location," 3GPP Draft, R1-121026 Ports Colation, 3rd Generation Partnership Project (3GPP), Mobile Competence Centre, 650 Route des Lucioles, F-06921 Sophia-Antipolis Cedex, France, TSG RAN WG4, Jeju, Korea, Mar. 26-30, 2012, XP050599267.

Office Action in corresponding Japanese Application No. 2014-555528 dated Nov. 8, 2016.

Ericsson; "Draft LS response on antenna ports co-location"; 3GPP TSG-RAN1 Meeting #68bis; R1-121796; Mar. 26-30, 2012; pp. 1-2; Jeju, Korea.

Ericsson, ST-Ericsson; "Discussion on quasi co-located antennas"; 3GPP TSG-RAN WG4 #63; R4-122702; May 21-25, 2012; pp. 1-7; Prague, Czech Republic.

Samsung; "Remaining issues on quasi co-location between CSI-RS, CRS and DMRS"; 3GPP TSG-RAN WG1#70bis meeting; R1-124558; Oct. 8-12, 2012; San, Diego, CA.

* cited by examiner

METHODS AND ARRANGEMENTS FOR CHANNEL ESTIMATION

TECHNICAL FIELD

The present invention relates to methods and arrangements for improved channel estimation.

BACKGROUND

The 3rd Generation Partnership Project (3GPP) is responsible for the standardization of the Universal Mobile Telecommunication System (UMTS) and Long Term Evolution (LTE). The 3GPP work on LTE is also referred to as Evolved Universal Terrestrial Radio Access Network (E-UTRAN). LTE is a technology for realizing high-speed packet-based communication that can reach high data rates both in the downlink and in the uplink, and is thought of as a next generation mobile communication system relative to UMTS. In order to support high data rates, LTE allows for a system bandwidth of 20 MHz, or up to 100 Hz when carrier aggregation is employed. LTE is also able to operate in different frequency bands and can operate in at least Frequency Division Duplex (FDD) and Time Division Duplex (TDD) modes.

LTE uses orthogonal frequency-division multiplexing (OFDM) in the downlink and discrete-Fourier-transform-spread (DFT-spread) OFDM in the uplink. The basic LTE physical resource can be seen as a time-frequency grid, as illustrated in FIG. 1, where each resource element corresponds to one subcarrier during one OFDM symbol interval (on a particular antenna port). There is one resource grid per antenna port.

An antenna port is a "virtual" antenna, which is defined by an antenna port-specific reference signal. An antenna port is defined such that the channel over which a symbol on the antenna port is conveyed can be inferred from the channel over which another symbol on the same antenna port is conveyed. The signal corresponding to an antenna port may possibly be transmitted by several physical antennas, which may also be geographically distributed. In other words, an antenna port may be transmitted from one or several transmission points. Conversely, one transmission point may transmit one or several antenna ports. In the following, an antenna port will be interchangeably referred to as an "RS port".

In the time domain, LTE downlink transmissions are organized into radio frames of 10 ms, each radio frame consisting of ten equally-sized subframes of 1 ms as illustrated in FIG. 2. A subframe is divided into two slots, each of 0.5 ms time duration.

The resource allocation in LTE is described in terms of resource blocks, where a resource block corresponds to one slot in the time domain and 12 contiguous 15 kHz subcarriers in the frequency domain. Two time-consecutive resource blocks represent a resource block pair, which corresponds to the time interval upon which scheduling operates.

Transmissions in LTE are dynamically scheduled in each subframe. The base station transmits downlink assignments/ uplink grants to certain UEs via the physical downlink control information (Physical Downlink Control Channels, PDCCH, and enhanced PDCCH, ePDCCH). The PDCCHs are transmitted in the first OFDM symbol(s) in each subframe and spans more or less the whole system bandwidth. A UE that has decoded a downlink assignment, carried by a PDCCH, knows which resource elements in the subframe contain data aimed for the UE. Similarly, upon receiving an uplink grant, the UE knows which time/frequency resources it should transmit upon. In LTE downlink, data is carried by the physical downlink shared data link (PDSCH) and in the uplink the corresponding link is referred to as the physical uplink shared channel (PUSCH).

Demodulation of received data requires estimation of the radio channel, which is performed using reference signals (RS). A reference signal comprises a collection of reference symbols, and these reference symbols and their position in the time-frequency grid are known to the receiver. In LTE, cell-specific reference signals (CRS) are transmitted in all downlink subframes. In addition to assisting downlink channel estimation, they are also used for measurements, e.g. mobility measurements, performed by the UEs. As of Release 10, LTE also supports UE-specific RS aimed for assisting channel estimation for demodulation of the PDSCH, as well as RS for measuring the channel for the purpose of channel state information (CSI) feedback from the UE. The latter are referred to as CSI-RS. CSI-RS are not transmitted in every subframe and they are generally sparser in time and frequency than RS used for demodulation. CSI-RS transmissions may occur every 5th, 10th, 20th, 40th, or 80th subframe according to an RRC configured periodicity parameter and an RRC configured subframe offset.

FIG. 3 illustrates how the mapping of physical control and data channels and reference signals may be done on resource elements within a downlink subframe. In this example, the PDCCHs occupy the first out of three possible OFDM symbols, so in this particular case the mapping of data could start already at the second OFDM symbol. Since the CRS are common to all UEs in the cell, the transmission of CRS cannot be easily adapted to suit the needs of a particular UE. This is in contrast to UE-specific RS, where each UE has RS of its own placed in the data region of FIG. 3 as part of PDSCH.

A UE operating in connected mode may be requested by the base station to report channel state information (CSI), e.g., reporting a suitable rank indicator (RI), one or more precoding matrix indices (PMIS) and a channel quality indicator (CQI). Other types of CSI are also conceivable, including explicit channel feedback and interference covariance feedback. The CSI feedback assists the base station in scheduling, including deciding the subframe and RBs for the transmission, which transmission scheme/precoder to use, and also provides information on a suitable user bit rate for the transmission (link adaptation). A detailed illustration of which resource elements within a resource block pair may potentially be occupied by UE-specific RS and CSI-RS is provided in FIG. 4. The CSI-RS utilizes an orthogonal cover code of length two to overlay two antenna ports on two consecutive REs. As seen, many different CSI-RS pattern are available. For the case of 2 CSI-RS antenna ports we see that there are 20 different patterns within a subframe. The corresponding number of patterns is 10 and 5 for 4 and 8 CSI-RS antenna ports, respectively. For TDD, some additional CSI-RS patterns are available.

Improved support for heterogeneous network operations is part of the ongoing specification of 3GPP LTE Release-10, and further improvements are discussed in the context of new features for Release-11. In heterogeneous networks, a mixture of cells of differently sized and overlapping coverage areas are deployed. One example of such deployments is illustrated in FIG. 5, where pico cells are deployed within the coverage area of a macro cell. Other examples of low power nodes, also referred to as points, in heterogeneous networks are home base stations and relays. The aim of deploying low power nodes such as pico base stations within the macro coverage area is to improve system capacity by means of cell splitting gains as well as to provide users with wide area experience of very high speed data access throughout the network. Heterogeneous deployments are in particular effective for covering traffic hotspots, i.e., small geographical areas with high user densities served by e.g., pico cells, and they represent an alternative deployment to denser macro networks.

A classical way of deploying a network is to let different transmission/reception points form separate cells. That is, the signals transmitted from or received at a point is associated with a cell-id that is different from the cell-id employed for other nearby points. Typically, each point transmits its own unique signals for broadcast (PBCH) and sync signals (PSS, SSS).

The mentioned classical strategy of one cell-id per point is depicted in FIG. 6 for a heterogeneous deployment where a number of low power (pico) points are placed within the coverage area of a higher power macro point. Similar principles apply to classical macro-cellular deployments, where all points have similar output power and may be placed in a more regular fashion than what is the case for a heterogeneous deployment.

An alternative to the classical deployment strategy is to instead let all the UEs within the geographical area outlined by the coverage of the high power macro point be served with signals associated with the same cell-id. In other words, from a UE perspective, the received signals appear to be coming from a single cell. This is illustrated in FIG. 7. Note that only one macro point is shown, other macro points would typically use different cell-ids (corresponding to different cells) unless they are co-located at the same site, corresponding to other sectors of the macro site. In the latter case of several co-located macro points, the same cell-id may be shared across the co-located macro-points and those pico points that correspond to the union of the coverage areas of the macro points. Sync, BCH and control signals are all transmitted from the high power point while data can be transmitted to a UE also from low power points by using shared data transmissions (PDSCH) relying on UE specific RS. Such an approach has benefits for those UEs that are capable of receiving the PDSCH based on UE-specific RS. Those UEs that only support CRS for PDSCH (which is likely to at least include all Release 8/9 UEs for FDD) have to settle for the transmission from the high power point and thus will not benefit in the downlink from the deployment of additional low power points.

The single cell-id approach is geared towards situations in which there is fast backhaul communication between the points associated to the same cell. A typical case would be a base station serving one or more sectors on a macro level as well as having fast fiber connections to remote radio units (RRUs) playing the role of the other points sharing the same cell-id. Those RRUs could represent low power points with one or more antennas each. Another example is when all the points have a similar power class with no single point having more significance than the others. The base station would then handle the signals from all RRUs in a similar manner.

A clear advantage of the shared cell approach compared with the classical one is that the typically involved handover procedure between cells only needs to be invoked on a macro basis. Another important advantage is that interference from CRS is greatly reduced since CRS does not have to be transmitted from every point. There is also much greater flexibility in coordination and scheduling among the points.

The concept of a point is heavily used in conjunction with techniques for coordinated multipoint (CoMP). In the present disclosure, a point (also referred to as a "transmission point" and/or a "reception point") corresponds to a set of antennas covering essentially the same geographical area in a similar manner. Thus, a point might correspond to one of the sectors at a site, but it may also correspond to a site having one or more antennas all intending to cover a similar geographical area. Often, different points represent different sites. Antennas correspond to different points when they are sufficiently geographically separated and/or have antenna diagrams pointing in sufficiently different directions.

Techniques for CoMP entail introducing dependencies in the scheduling or transmission/reception among different points, in contrast to conventional cellular systems where a point, from a scheduling point of view, is operated more or less independently from the other points. One fundamental property of DL CoMP is the possibility to transmit different signals and/or channels from different geographical locations. One of the principles guiding the design of the LTE system is transparency of the network to the UE. In other words, the UE should be able to demodulate and decode its intended channels without specific knowledge of scheduling assignments for other UEs or network deployments.

For example, different CSI-RS patterns may be transmitted from ports belonging to different transmission points. Feedback based on such patterns may be exploited e.g. for point selection and/or for optimization of precoding weights and CoMP scheduling. Alternatively, the same CSI-RS pattern may be jointly transmitted by different transmission points in order to generate an aggregated feedback including joint spatial information for multiple points. In any case, UEs are generally not aware of the geographical location from which each antenna port is transmitted.

CRS are typically transmitted from a static set of points. Nevertheless, for certain deployments, it is possible to transmit different CRS ports from different geographical locations. One application of this technique is in distributed deployments, where the transmit antennas belonging to the same node are deployed in a non-collocated fashion.

DMRS or UE-specific RS are employed for demodulation of data channels and possibly certain control channels (ePDCCH). Data may be transmitted from different points than other information (e.g. control signaling). This is one of the main drivers behind the use of UE-specific RS, which relieves the UE from having to know many of the properties of the transmission and thus allows flexible transmission schemes to be used from the network side. This is referred to as transmission transparency (with respect to the UE). A problem is, however, that the estimation accuracy of UE-specific RS may not be sufficient in some situations. Furthermore, especially in case of CoMP and/or distributed deployments, the DMRS for a specific UE-might be transmitted from geographically separated ports.

There is a need in the art for mechanisms for improved channel estimation.

SUMMARY

An object of some embodiments is to provide a mechanism for improved channel estimation, in particular in CoMP scenarios.

Some embodiments provide a method for channel estimation in a wireless device. According to this method, the wireless device obtains an indication that a set of antenna ports, or antenna port types, share at least one channel property. The device then estimates one or more of the shared channel properties. The estimation is based at least on a first reference signal received from a first antenna port included in the set, or having a type corresponding to one of the types in the set. Further, the wireless device performing channel estimation based on a second reference signal received from a second antenna port included in the set, or having a type corresponding to one of the types in the set. The channel estimation is performed using at least the estimated channel properties.

In particular embodiments, the wireless device receives a message from the network node comprising the indication. In other embodiments, the set is determined based on a rule.

In some embodiments, the wireless device is thus able to use estimated channel properties for one antenna port in the estimation for another antenna port, by assuming co-location of certain antenna ports. In a particular example, the device may perform joint estimation based on two or more antenna ports, which leads to improved estimation accuracy. In another example, the device may apply an estimated property for one port to another port in the set, which may lead to a faster estimation process.

Some embodiments provide a method in a network node. The method comprises obtaining an indication that a set of antenna ports, or antenna port types, share at least one channel property. The network then transmitting signals corresponding to at least two of the antenna ports in the set, or antenna ports having types comprised in the set, from the same set of transmission points.

Thus, in some embodiments the network node enables the wireless device to perform improved channel estimation, by ensuring that certain antenna ports are co-located.

Some embodiments provide a wireless device for performing channel estimation. The device comprises radio circuitry and processing circuitry. The processing circuitry further comprises a channel analyzer and a channel estimator. The processing circuitry is configured to obtain an indication that a set of antenna ports, or antenna port types, share at least one channel property. The channel analyzer is configured to estimate one or more of the shared channel properties based at least on a first reference signal transmitted from a first antenna port included in the set, or having a type corresponding to one of the types in the set, wherein the first reference signal is received via the radio circuitry. The channel estimator is configured to perform channel estimation based on a second reference signal transmitted from a second antenna port included in the set, or having a type corresponding to one of the types in the set, wherein the channel estimation is performed using at least the estimated channel properties, and wherein the second reference signal is received via the radio circuitry.

Some embodiments provide a network node comprising radio circuitry and processing circuitry. The processing circuitry is configured to obtain an indication that a set of antenna ports, or antenna port types, share at least one channel property. The processing circuitry is further configured to transmit, via the radio circuitry, at least two of the antenna ports in the set, or antenna ports having types comprised in the set, from the same transmission point.

DETAILED DESCRIPTION

Figure 1:
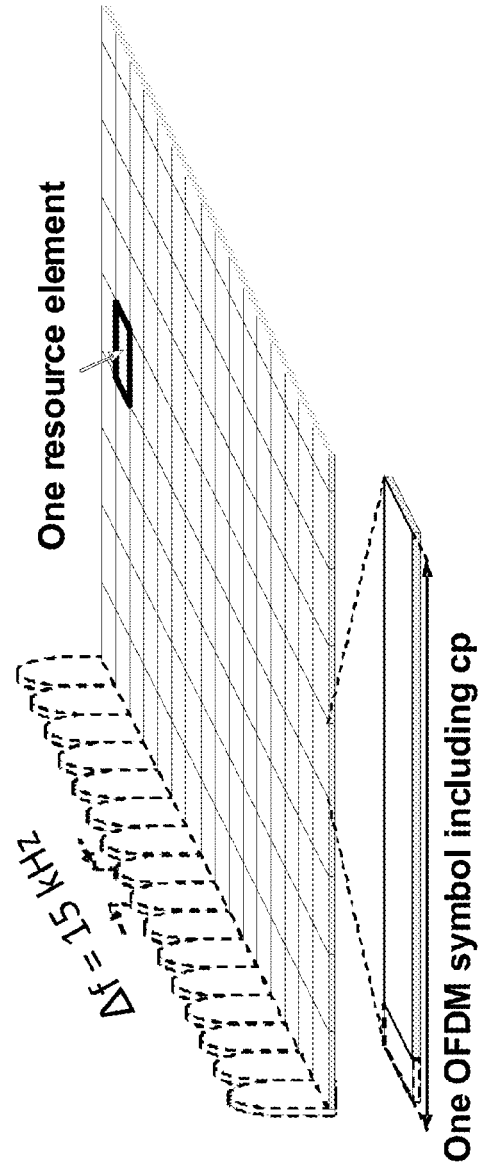
FIG. 1 is a schematic diagram showing the LTE downlink physical resource.
Figure 2:
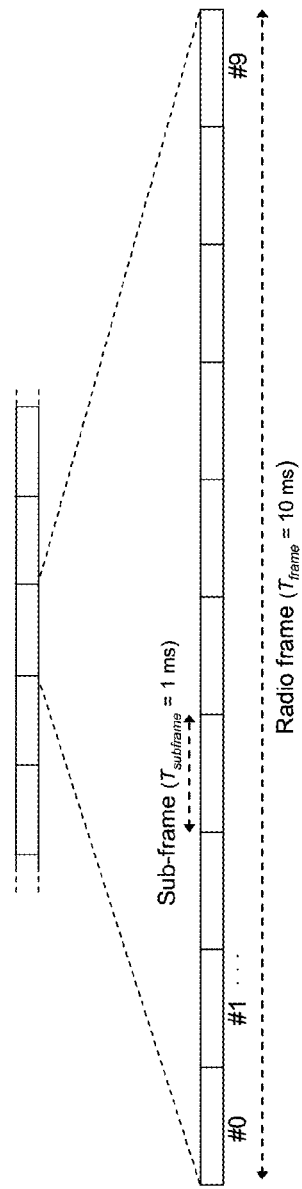
FIG. 2 is a schematic diagram showing the LTE time-domain structure.
Figure 3:
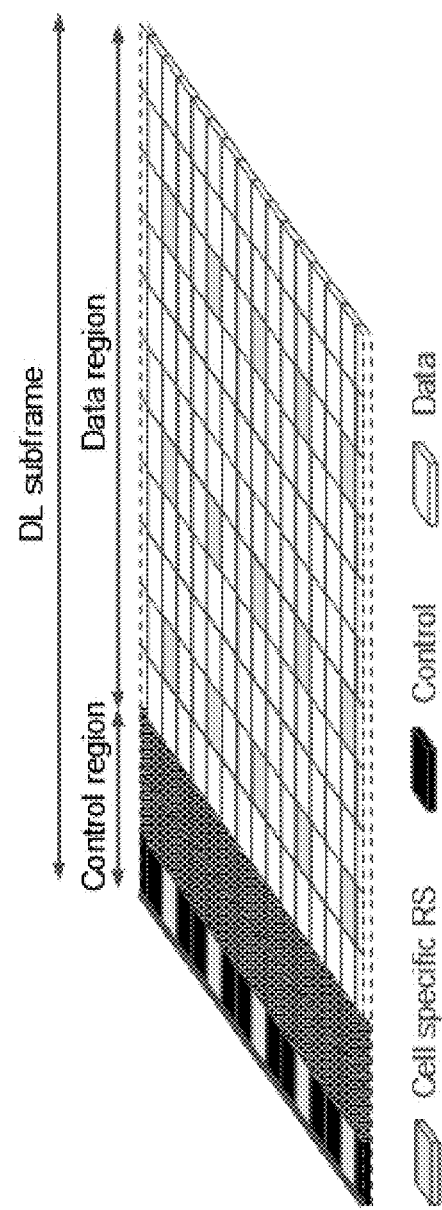
FIG. 3 is a schematic diagram showing an LTE downlink subframe.
Figure 4:
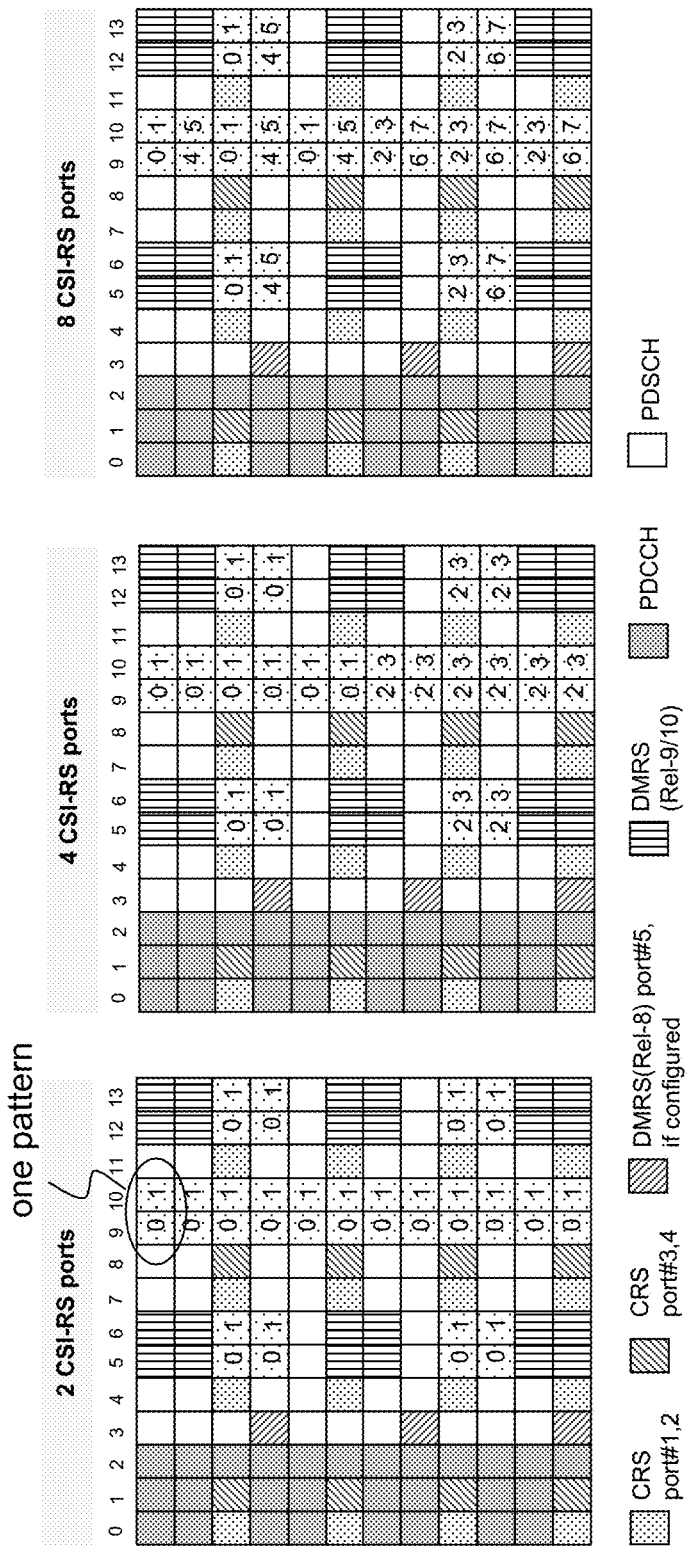
FIG. 4 is a schematic diagram showing possible reference signal patterns.
Figure 5:
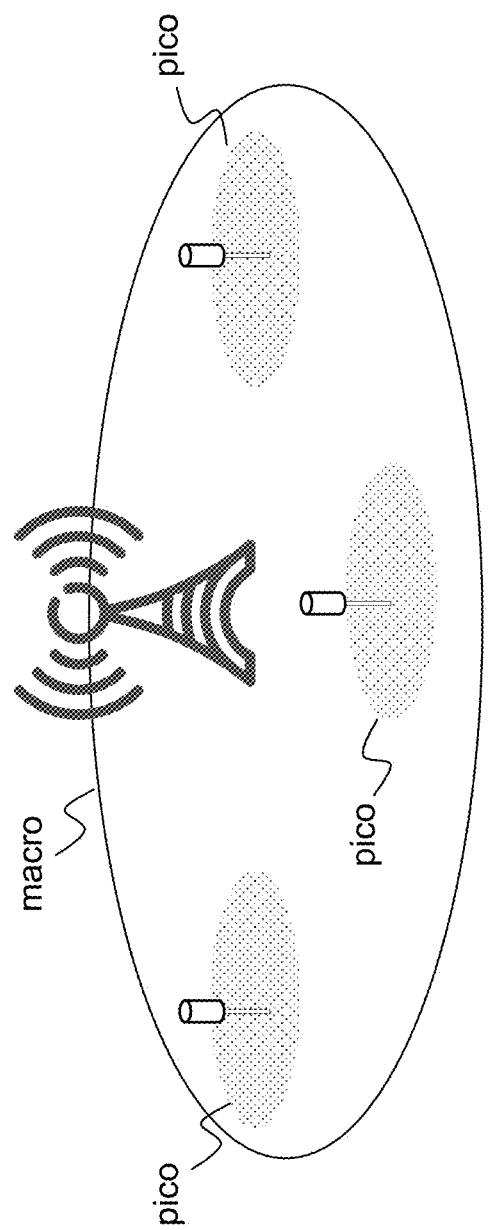
FIG. 5 is a schematic diagram showing an example macro and pico cell deployment.
Figure 6:
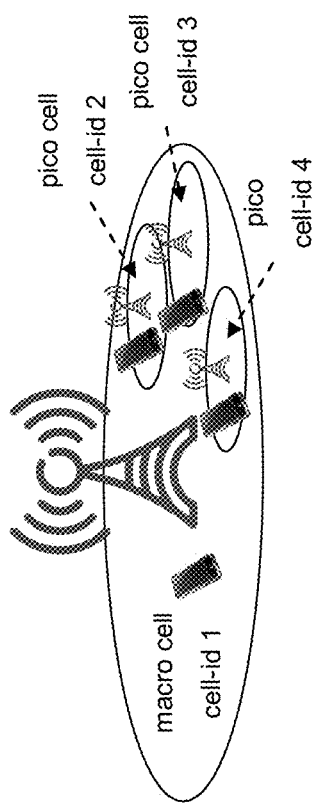
FIG. 6 is a schematic diagram showing an example heterogeneous deployment.
Figure 7:
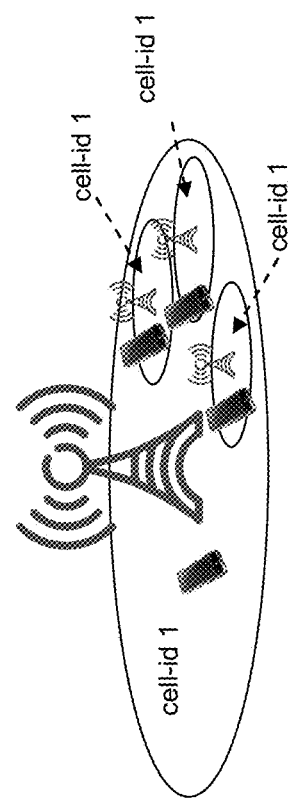
FIG. 7 is a schematic diagram showing another example heterogeneous deployment.

As explained above, reference signals may be transmitted from geographically separated ports. Geographical separation of RS ports implies that instantaneous channel coefficients from each port towards the UE are in general different. Furthermore, even the statistical properties of the channels for different ports and RS types may be significantly different. Example of such statistical properties include the SNR for each port, the delay spread, the Doppler spread, the received timing (i.e., the timing of the first significant channel tap), and the number of significant channel taps. In LTE, nothing can be assumed about the properties of the channel corresponding to an antenna port based on the properties of the channel of another antenna port. This is in fact a key part of maintaining transmission transparency.

Based on the above observations, the UE needs to perform independent estimation for each RS port of interest for each RS. This may result in inadequate channel estimation quality for certain RS ports, leading to undesirable link and system performance degradation. A related problem which indirectly also affects the estimation accuracy is that it is not possible for the UEs to assume co-location of DMRS ports with other RS ports, particularly in CoMP scenarios.

Some embodiments disclosed herein provide the UE with selected information about RS ports grouping, in order to allow channel estimator implementations to exploit common channel properties for different RS ports and/or RS types within a group. The information comprises e.g. of signaling which reference signals may be assumed to be used in combination with each other to form a channel estimate corresponding to a certain antenna port. Similarly but stated differently, which antenna ports may be assumed to have channels that can be utilized for inferring properties of the channel over which symbols for the antenna port of interest is conveyed. That is, the UE may be signaled that it is allowed to assume that reference signals on some antenna ports may be used to assist in the channel estimation of a channel for another antenna port.

The antenna ports whose channels exhibit such mutual dependence can be said to form a group. In practice, this assumption would allow the UE to assume that at least some statistical properties of the channels are similar over different antenna ports. Such information allows the UE to jointly estimate channel properties and to achieve increased estimation accuracy for the corresponding channels estimates. Thus, particular embodiments enable improved channel estimation by enabling joint channel parameters when it is applicable.

The network typically configures the UE to assist reception of various signals and/or channels based on different types of reference signals including, e.g., CRS, DMRS, CSI-RS. Possibly, RS may be exploited for estimation of propagation parameters and preferred transmission properties to be reported by the UEs to the network, e.g., for link adaptation and scheduling.

It is observed here that, even though in general the channel from each antenna port to each UE receive port is substantially unique, some statistical properties and propagation parameters may be common or similar among different antenna port, depending on whether the different antenna ports originate from the same point or not. Such properties include, e.g., the SNR level for each port, the delay spread, the Doppler spread, the received timing (i.e., the timing of the first significant channel tap) and the number of significant channel taps.

Typically, channel estimation algorithms perform a three step operation. A first step consists of the estimation of some of the statistical properties of the channel. A second step consists of generating an estimation filter based on such parameters. A third step consists of applying the estimation filter to the received signal in order to obtain channel estimates. The filter may be equivalently applied in the time or frequency domain. Some channel estimator implementations may not be based on the three steps method described above, but still exploit the same principles.

Obviously, accurate estimation of the filter parameters in the first step leads to improved channel estimation. Even though it is often in principle possible for the UE to obtain such filter parameters from observation of the channel over a single subframe and for one RS port, it is usually possible for the UE to improve the filter parameters estimation accuracy by combining measurements associated with different antenna ports (i.e., different RS transmissions) sharing similar statistical properties. It is observed here that the network is typically aware of which RS ports are associated with channels with similar properties, based on its knowledge of how antenna ports are mapped to physical points, while the UE is not aware a-priori of such information because of the network transparency principle.

Some embodiments comprise including information in the downlink signaling in order to enable improved channel estimation in the UE. More specifically, the signaling from the network to the UE includes information about which reference signals and/or antenna ports and/or RS types may be assumed by the UE to be used together when demodulating signals on certain antenna port(s), i.e., which antenna ports can be assumed to share similar channel properties. The UE may then exploit such information to perform joint or partly joint channel estimation for at least some of the channels with similar properties.

Often, channels associated to RS transmitted from the same point share similar statistical properties and propagation characteristics. Therefore, in one example, the network may indicate by signaling to the UE at least a subset of the RS that are transmitted from a common point.

Signaling to the UE of the RS ports associated with similar channel properties may be defined in different ways. In one example, the network includes in the semi-static RRC signaling an index for at least some of the RS ports and types sharing similar properties. RS ports associated with the same index are assumed by the UE to be associated with similar channel properties.

In another example, a signaling flag is employed to signal if a certain subset of RS ports is associated to the same channel.

In another example additional bits may be provided to signal if a certain RS type (e.g., CRS, DMRS, CSI-RS) maybe be assumed to share similar channel properties of some of the other channel types. In one example, a flag is provided for at least some of the DMRS and/or CSI-RS ports. When such flag is enabled, the UE assumes that all the corresponding RS ports share the similar channel properties as CRS.

In a further example, two flags per subset of RS ports are provided, one of such flags indicating that all the associated ports share similar channel properties and the other flag indicating that the associated ports share similar channel properties as at least some of the CRS ports.

The flexibility of signaling grouping of at least partly dependent antenna ports can vary and in one embodiment it may be based on signaling dependence between antenna ports of different types, e.g., that the channels on the antenna ports where CRS are transmitted may be used to infer properties of the channel on antenna ports over which UE specific RS are transmitted (e.g., DMRS). Alternatively, CSI-RS may be exploited for assisting in the estimation of channels for antenna ports carrying UE specific RS.

All the signaling examples described above may be alternatively carried dynamically by scheduling assignments, i.e., DCI formats. In such case, PDCCH should be decoded based on the RS properties indicated by RRC signaling (if any), while the additional RS properties indicated by the scheduling grants are exploited for PDSCH demodulation. The dynamic signaling could even include signaling which CSI-RS resource (or CRS including information for identifying which cell the CRS is associated with) may be assumed by the UE to be allowed to be used in assisting in DMRS/UE specific RS channel estimation in a certain transmission, providing efficient support for dynamic point selection.

Furthermore, the above examples may be combined for further flexibility.

In further examples, the network may base grouping of RS properties on a subset of the channel properties, as well as other criteria.

One possibility is to define that RS ports that are made orthogonal by use of orthogonal codes (e.g., OCC) always share the similar channel properties. Such assumption may be statically defined a-priori (i.e., defined in the standard) or alternatively signaled in a semi-static fashion by the network.

In another example the network signals to the UE that a subset of RS ports shares similar propagation properties when such RS ports are associated with collocated antennas with the same polarization.

In further examples the network signals to the UE that a limited set of channel properties (e.g., timing and/or Doppler and/or delay spread and/or SNR) are shared by a subset of RS ports. Some of the signaling procedures described above may be exploited, in addition to the definition of which set of channel properties shall be assumed by the UE to be common to the indicated RS ports.

Within the context of this disclosure, the term "shared channel property", "shared channel parameter", or "shared propagation parameter", means that the value of a propagation parameter, i.e. channel property, for the channel corresponding to one antenna port is the same as, or similar to, the value of the same parameter for the channel corresponding to another antenna port. In this context, "similar" means that the values differ by less than a predefined amount, which may be viewed as a margin of tolerance. Thus, the shared properties are either the same, or similar enough that they may be used for channel estimation for any of the channels with acceptable accuracy. Stated differently, shared properties are sufficiently similar to allow improved estimation by jointly estimating them as a common property for the corresponding RS ports.

In further examples, in order to reduce signaling overhead, grouping of RS ports is defined a-priori for certain RS ports of the same type. This allows UEs to exploit common channel properties for such groups without need of dedicated signaling. In case some of the above signaling techniques are also employed, it is possible to signal channel properties commonality between a-priori defined groups of RS ports, instead for each port individually. Such hard-coded dependence mandates in fact that the corresponding ports are transmitted from the same point(s) by the network.

Additionally, some embodiments include the possibility of defining an a-priori timing relation between synchronization signals (e.g., SSS and/or PSS) and some RS-port(s), enabling the UE to infer RS timing from the synchronization signals. The UE is thus able to perform joint timing estimation for the synchronization signals and the RS ports with related timing. The timing relation may be expressed, e.g., in terms of a pre-defined timing difference range and/or offset.

Figure 8:
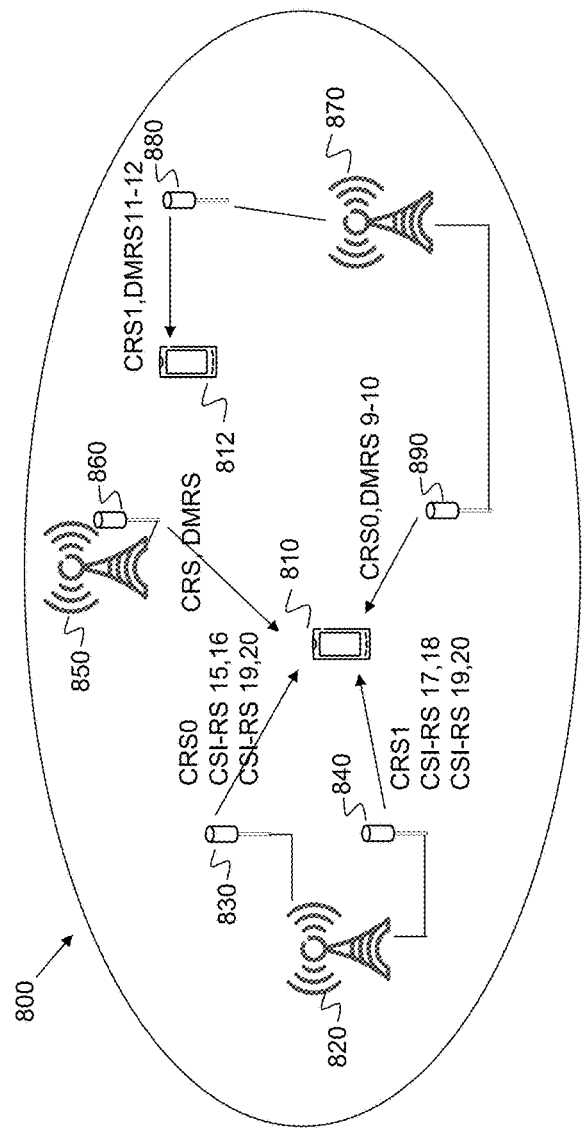
FIG. 8 is a schematic diagram illustrating a wireless communication system.

FIG. 8 illustrates a wireless communications system 800 in which various embodiments of the invention may be implemented. Three network nodes 820, 850 and 870 are shown. Network node 820 control two transmission points 830 and 840. Similarly, network node 850 controls one transmission point 860, and network node 870 controls transmission points 880 and 890. In the following, for purposes of illustration and not limitation, it will be assumed that the communications system 800 is an LTE system, and that the network nodes 820, 850 and 870 are eNodeBs. The transmission points may correspond to separate antennas at the eNodeBs, e.g. sector antennas, or they may be remote radio units (RRU:s) connected to the respective eNodeB. The number of transmission points shown shall not be construed as limiting; it will be appreciated that, generally speaking, each network node may control one or more transmission points, which may either be physically co-located with the network node, or geographically distributed. Furthermore, although this example shows different transmission points being controlled by different network nodes, another possible scenario is that one single network node controls several or even all of the transmission points 830, 840, 860, 880 and 890. In the scenario shown in FIG. 8, it is assumed that some or all of the network nodes 820, 850, and 870 are connected, e.g. by means of a transport network, to be able to exchange information for possible coordination of transmission and reception.

The communications system 800 further comprises two wireless devices 810 and 812. Within the context of this disclosure, the term "wireless device" encompasses any type of wireless node which is able to communicate with a network node, such as a base station, or with another wireless device by transmitting and/or receiving wireless signals. Thus, the term "wireless device" encompasses, but is not limited to: a user equipment, a mobile terminal, a stationary or mobile wireless device for machine-to-machine communication, an integrated or embedded wireless card, an externally plugged in wireless card, a dongle etc. The wireless device may also be a network node, e.g. a base station.

Figure 9:
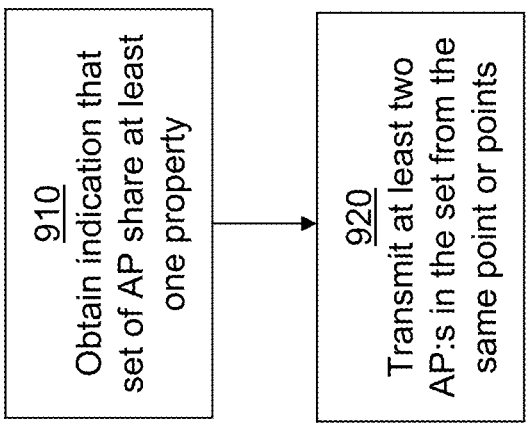
FIG. 9 is a flow chart showing an example method in a network node.

With reference to FIG. 8 and the flowchart in FIG. 9, a method in a network node according to some embodiments will now be described. The method may be executed in one of the network nodes 820, 850, or 870.

Throughout this disclosure, whenever it is stated that two antenna ports are co-located, or can be assumed to be co-located, this means, in a general sense, that at least one of the following channel parameters, i.e. propagation properties:

Delay spread
Doppler spread
Signal to noise ratio
Frame synchronization of the channel over which a symbol on the first antenna port is conveyed can be inferred from the channel over which another symbol on the other antenna port is conveyed. As a particular example, a set of antenna ports are co-located if their corresponding signals are transmitted from the same set of transmission points, where the set may comprise one or more points. It should be noted in this context that the signal (e.g. RS) corresponding to an antenna port may be transmitted in distributed fashion from multiple points. Two such distributed antenna ports are considered to be co-located if the corresponding signals are transmitted from the same set of points. For example, referring to FIG. 8, CSI-RS 19 is transmitted from points 830 and 840, and CSI-RS 20 is also transmitted from 830 and 840. Thus, CSI-RS ports 19 and 20 are co-located. Stated differently, two antenna ports may be considered to be co-located if their corresponding reference signals are mapped to the same "virtual point", where a virtual point is defined as a combination of one or more points.

According to the method, the network node obtains 910 an indication that a set of antenna ports share at least one channel property. It will be appreciated that this is just a short-hand way of saying that the channels corresponding to each of the antenna ports in the set share at least one channel property, i.e. propagation parameter. The indication may be obtained in different ways. In one variant, the network node determines the set based on a rule. In another variant, the network node obtains the indication either from another network node, or from a storage area, e.g. a memory or a database. The storage area may be internal to the network node, or connected to it.

As a specific example, the network node obtains an indication that CRS 0 and CRS 2, and CRS 1 and 3 should be co-located. Thus, CRS 0 and CRS 2 form one set, and CRS 1 and CRS 3 form another set. This is illustrated in FIG. 8 by network node 820, which transmits CRS 0 from point 830, and CRS 1 from point 840. This particular grouping is thus compatible with distributed antenna deployment for two transmit antennas. It is further noted that, since cross-polarized antennas are often employed when two transmit antennas are used, it may be beneficial to enforce independent channel estimation for ports 0 and 1. However, if the performance for two antennas is a concern, it is equally possible to group the ports CRS 0 and CRS 1, and the ports CRS 2 and CRS 3. This would limit distributed CRS deployments to the 4 antenna case.

In another specific example, obtaining the indication comprises determining that antenna ports transmitting reference signals that are code multiplexed using an orthogonal cover code are part of the same set. For example, a possible grouping of CSI-RS is (15, 16) (17, 18) (19, 20) (21, 22), and a possible grouping of DMRS is (7, 8) (9, 10) (11, 13) (12, 14) or (7, 8, 11, 13) (9, 10, 12, 14).

One of the possible CSI-RS groupings is illustrated in FIG. 8 by network node 820. An advantage of transmitting signals corresponding to antenna ports that are divided by an OCC from the same antenna port is that the signals will have the same Doppler. OCC is ineffective at high Doppler, and orthogonality is destroyed. If we divide high and low Doppler ports by OCC, all slow ports will be interfered by the fast ports. On the contrary, if OCC-multiplexed ports are grouped by Doppler, the paired slow ports will preserve orthogonality while only the fast ports, mutually interfering with each other, will lose orthogonality.

In a variant of this embodiment, the indication is based on antenna port types, rather than individual antenna ports. That is to say, in step 910 the network node obtains an indication that a set of antenna port types share at least one channel property. The antenna port types correspond to types of reference signals transmitted by the ports. Some examples of antenna port types are DMRS, CSI-RS, or CRS. As a particular example, the network node obtains an indication that CRS and DMRS ports should be co-located, i.e. that all CRS and DMRS ports should be transmitted from the same transmission point, or set of points. As another example, the network node obtains an indication that ports of type DMRS should be co-located, i.e. the antenna ports that are transmitting DMRS should be co-located. Optionally, the indication may be device-specific. For example, the network node may obtain an indication that CRS and DMRS ports for a specific device should be co-located. This option is illustrated in FIG. 8 by network node 870, which transmits CRS 0 and DMRS 9-10, directed to wireless device 810, from the single transmission point 890, and transmits CRS 1 and DMRS 11-12, which are directed to wireless device 812, from transmission point 880.

Further example groupings, which may be applied in this embodiment, are shown in Table 1 below.

TABLE 1

Examples of pre-defined co-location rules.

| Example groupings | CRS | DMRS | CSI-RS |
|---|---|---|---|
| Example 1 (suitable for interleaved indoor deployments) | (0, 2), (1, 3) | (7, 8), (9, 10), (11, 13), (12, 14) | (15, 16), (17, 18), (19, 20), (21, 22) |
| Example 2 (optimized for 2tx non-interleaved deployments) | (0, 1), (2, 3) | (7, 8), (9, 10), (11, 13), (12, 14) | (15, 16), (17, 18), (19, 20), (21, 22) |

The network node then transmits 920 signals corresponding to at least two of the antenna ports in the set from the same transmission point or points. By transmitting signals for several antenna ports from the same point or points, the network node ensures that those antenna ports will be co-located according to the above definition. This enables a wireless device, e.g. device 810 or 812, to perform joint estimation of the shared channel properties. Alternatively, a UE with limited processing capabilities may estimate the channel properties for the signal corresponding to one or more of the antenna ports and exploit such properties for estimating the channels corresponding to other co-located antenna ports.

In this context, the signals corresponding to an antenna port comprise the antenna port-specific reference signal, as well as the corresponding data transmitted on the antenna port.

Figure 10:
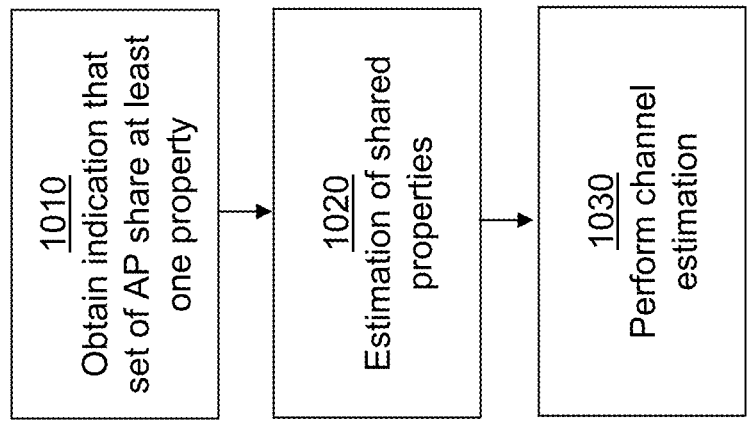
FIG. 10 is a flow chart showing an example method in a wireless device.

With reference to FIG. 8 and the flowchart in FIG. 10, a method for channel estimation in a wireless device according to some embodiments will now be described. The method may be implemented in one of the wireless devices 810 or 812.

According to the method, the wireless device obtains 1010 an indication that a set of antenna ports, or antenna port types, share at least one channel property. The indication may be obtained in different ways. In one variant, the wireless device determines the set based on a rule. In another variant, the wireless device obtains the indication from an internal storage area, e.g. a memory or a database.

The indication may indicate that the set of antenna ports or antenna port types can be considered to be co-located. As mentioned above, this implies that at least one of the properties delay spread, Doppler spread, signal-to-noise ratio, and frame synchronization are shared. In particular variants, the indication may indicate that all these properties are shared. In the case where only some properties are shared, the wireless device may further obtain, from the network node, an indication of which properties are shared. Alternatively, the wireless device could be preconfigured to assume that certain properties are shared.

In a particular example, antenna ports whose reference signals are code multiplexed using an orthogonal cover code are considered to be part of the same set, and antenna ports whose reference signals are not code multiplexed using an orthogonal cover code are considered to be part of different sets.

Other example port groupings correspond to those described above in connection with FIG. 9. Notably, when the indication is based on a rule or obtained from internal storage, it is implied that the network node or nodes serving the wireless device follow the same rule, and actually transmit the ports that are assumed to be co-located from the same point. This may be ensured by encoding the rule or rules into a standard.

The wireless device then jointly estimates 1020 one or more of the shared channel properties, based on a first reference signal received from a first antenna port included in the set, or having a type corresponding to one of the types in the set, and on a second reference signal received from a second antenna port included in the set, or having a type corresponding to one of the types in the set. Optionally, the joint estimation may be based on more than two reference signals corresponding to antenna ports or port types in the set. The channel properties to be estimated may be one or more of the signal-to-noise ratio, delay spread, doppler spread, received timing, and the number of significant channel taps.

After estimating the shared properties, the wireless device performs 1030 channel estimation based on the second reference signal. The channel estimation is performed using at least the estimated channel properties. In particular embodiments, the step of performing channel estimation comprises generating an estimation filter based on the estimated channel properties, and applying the estimation filter to the second reference signal to obtain a channel estimate. Optionally, the wireless device may apply the estimation filter to at least one other reference signal received from an antenna port included in the set, or having a type corresponding to one of the types in the set, to obtain a second channel estimate.

Figure 11:
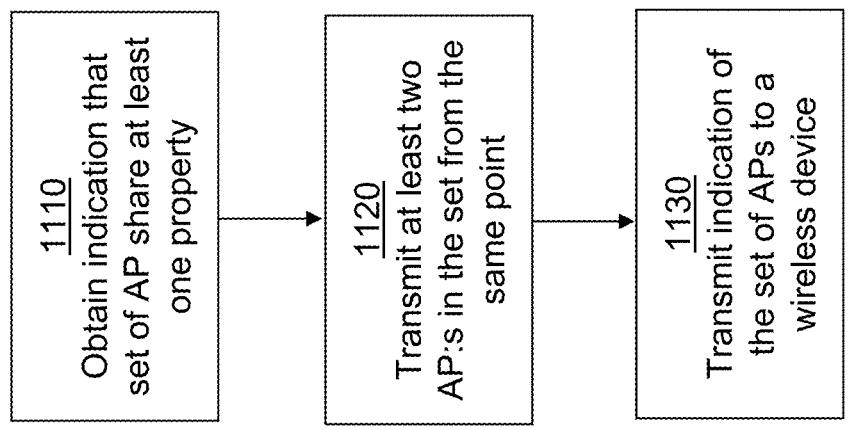
FIG. 11 is a flow chart showing an example method in a network node.

With reference to FIG. 8 and the flow chart in FIG. 11, a method in a network node according to some embodiments will now be described. The method may be executed in one of the network nodes 820, 850, or 870.

According to the method, the network node obtains 1110 an indication that a set of antenna ports, or antenna port types, share at least one channel property. This step corresponds to 910 above, and the same variants apply.

The network node then transmits 1120 signals corresponding to at least two of the antenna ports or antenna port types in the set from the same transmission point or points. This step corresponds to 920 above, and the same variants apply.

The network node then transmits 1130 an indication of the set of antenna ports, or antenna port types, to at least one wireless device served by the network node, e.g. wireless device 810 or 812. The indication may be transmitted in system information, in an RRC message, or in downlink control information.

In a variant, the indication further indicates one or more resource block groups (RBGs) across which the set of antenna ports or antenna port types share at least one channel property. A resource block group (RBG) consists of a set of consecutive physical resource blocks, which are not necessarily adjacent to each other. Generally, an RBG may comprise 1 to 4 resource blocks, depending on the system bandwidth. The network node may apply a different precoder for each RBG, which implies that different channel properties may exist for each RBG. Different transmission points may also employed for each resource block group.

As a particular example, the network node may indicate to the wireless device that certain DMRS ports share the same channel properties for a given set of RBGs in a subframe, and for the given wireless device.

As another example, the network node indicates to the wireless device that a set of RBGs share similar channel properties as a given set of antenna ports, or antenna port types.

In another variant, the indication further indicates a time interval during which the set of antenna ports or antenna port types share at least one channel property. The network node transmits 1120 signals corresponding to at least two of the antenna ports in the set, or antenna ports having types comprised in the set, from the same set of transmission points during the indicated time interval. The time interval may e.g. be indicated as a number of subframes. This enables the wireless device to time-average the corresponding estimated channel. If no time interval is indicated, the network node may transmit the antenna ports in the set from the same set of transmission points during a predefined time period, or until a new indication is sent. This variant may be used in conjunction with signalling a set of RBGs over which the ports share similar channel properties.

In another variant, the network node transmits a further indication of a timing relation between one or more antenna ports, and one or more synchronization signals, e.g. SSS and/or PSS. This enables the wireless device to infer RS timing from the synchronization signals and to perform joint timing estimation as discussed above. The timing relation may be indicated, e.g., in terms of a pre-defined timing difference range and/or offset.

In yet another variant, the indication is provided in the form of a message configuring the device to report wideband feedback (e.g., wideband PMI on PUCCH1-1 or PUCCH2-1 or PUCCH3-1). This indicates to the wireless device that the UE-specific DMRS ports are co-located over the entire PDSCH bandwidth. Alternatively, a first indication may indicate that the DMRS are co-located. Subsequently, the network node configures the device to report wideband feedback, and this indicates that the co-location applies over the entire bandwidth.

With reference to FIG. 8 and the flowchart in FIG. 10, a method for channel estimation in a wireless device according to some embodiments will now be described.

According to the method, the wireless device receives 1010 a message from a network node, the message comprising an indication that a set of antenna ports, or antenna port types, share at least one channel property. The indication may indicate that the set of antenna ports or antenna port types can be considered to be co-located, i.e. that all channel properties are shared.

The wireless device then jointly estimates 1020 one or more of the shared channel properties, as has been described above.

After estimating the shared properties, the wireless device performs 1030 channel estimation based on the second reference signal, in the same way as has been described above.

In a variant, the indication further indicates one or more resource block groups (RBGs) across which the set of antenna ports or antenna port types share at least one channel property. As a particular example, the wireless device may receive an indication that certain DMRS ports share the same channel properties for a given set of RBGs in a subframe. In step 1020, the wireless device then estimates the shared properties over the given set of RBGs. Across the remaining RBGs, the wireless device performs individual estimation of channel properties.

As another example, the network node indicates to the wireless device that a set of RBGs share similar channel properties as a given set of antenna ports, or antenna port types.

In another variant, the indication further indicates a time interval during which the set of antenna ports or antenna port types share at least one channel property. The channel estimator may then time-average the corresponding channel estimates. The time interval may e.g. be indicated as a number of subframes. If no time interval is indicated, the wireless device may assume the channel properties will be shared during a predefined time period, or until a new indication is received. This variant may be used in conjunction with receiving an indication of a set of RBGs over which the ports share similar channel properties.

In another variant, the wireless device receives a further indication of a timing relation between one or more antenna ports, and one or more synchronization signals, e.g. SSS and/or PSS. The wireless device infers RS timing from the synchronization signals, and in step 1020 the wireless device also performs joint timing estimation as discussed above.

In yet another variant, the indication is received in the form of a message configuring the device to report wideband feedback (e.g., wideband PMI on PUCCH1-1 or PUCCH2-1 or PUCCH3-1). This indicates to the wireless device that the UE-specific DMRS ports are co-located over the entire PDSCH bandwidth. Alternatively, the wireless device obtains a first indication that the DMRS are co-located (this indication may be obtained in any of the ways described above). Subsequently, the wireless device receives a message configuring it to report wideband feedback, and this indicates to the wireless device that the co-location applies over the entire bandwidth.

In the embodiments described in connection with FIGS. 9-11, it has been assumed that the wireless device applies joint estimation, i.e. performs measurements on several reference signals, which are combined to form a joint estimate. This leads to improved accuracy. However, another possibility is to estimate the shared properties based on one reference signal, and then apply the estimated properties when performing channel estimation on another reference signal. This may lead to improved performance, as fewer measurements need to be performed.

Figure 12:
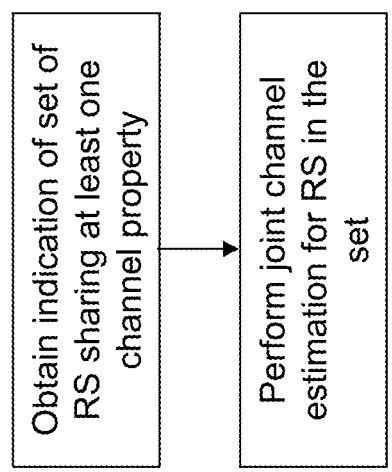
FIG. 12 is a flow chart showing an example method in a wireless device.

According to some embodiments, a method in a wireless device, e.g., a UE, for performing channel estimation is provided. This method is illustrated in FIG. 12.

The wireless device obtains information indicating that a set of reference signal (RS) ports share at least one channel property, or channel parameter.

In a variant, the wireless device receives information from a network node, e.g., a base station such as an eNB, indicating the set of reference signal ports. The set may be associated with an index, and the information may then comprise an indication that one or more RS ports are associated with the index. Various other ways of representing the information are possible, and will be described below. The information may be comprised in an RRC message, or in a DCI format.

In another variant, the wireless device determines the set of RS ports sharing at least one channel property based on a rule or predetermined mapping. For example, the wireless device may assume that RS ports that are code division multiplexed together using orthogonal codes share the same channel properties.

The wireless device then performs joint estimation of the shared channel properties for the reference signals corresponding to the ports in the set.

The set of reference signals may be equivalently referred to as a group of reference signals.

Figure 13:
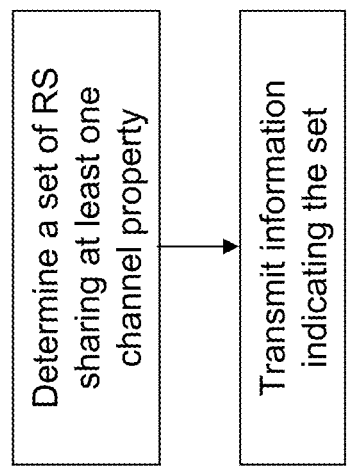
FIG. 13 is a flow chart showing an example method in a network node.

According to some embodiments, a method in a network node, e.g., a base station such as an eNB, is provided. This method is illustrated in FIG. 13.

The network node determines a set of reference signal (RS) ports that share at least one channel property, or channel parameter. In one example, the network node determines that RS ports that are transmitted from the same transmission point, or set of transmission points, are part of the same set. Other ways of determining the set are possible, and will be described below.

The network node then transmits information indicating the set of RS ports to a wireless device, thereby enabling the wireless device to perform joint channel estimation for the RS corresponding to the ports in the set. The set may be associated with an index, and the information may then comprise an indication that one or more RS ports are associated with the index. Various other ways of representing the information are possible, and will be described below. The information may be transmitted in an RRC message, or in a DCI format.

Figure 14:
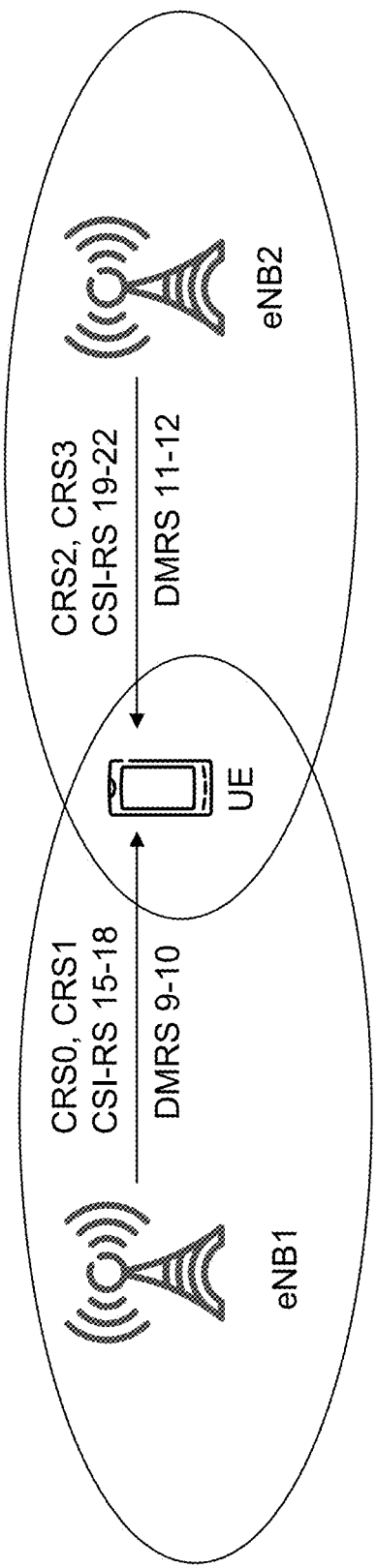
FIG. 14 is a schematic diagram showing an example network.

Although the described solutions may be implemented in any appropriate type of telecommunication system supporting any suitable communication standards and using any suitable components, particular embodiments of the described solutions may be implemented in an LTE network using downlink CoMP, such as that shown in FIG. 8, or that illustrated in FIG. 14.

The example network may further include any additional elements suitable to support communication between wireless devices or between a wireless device and another communication device (such as a landline telephone).

Figure 15:
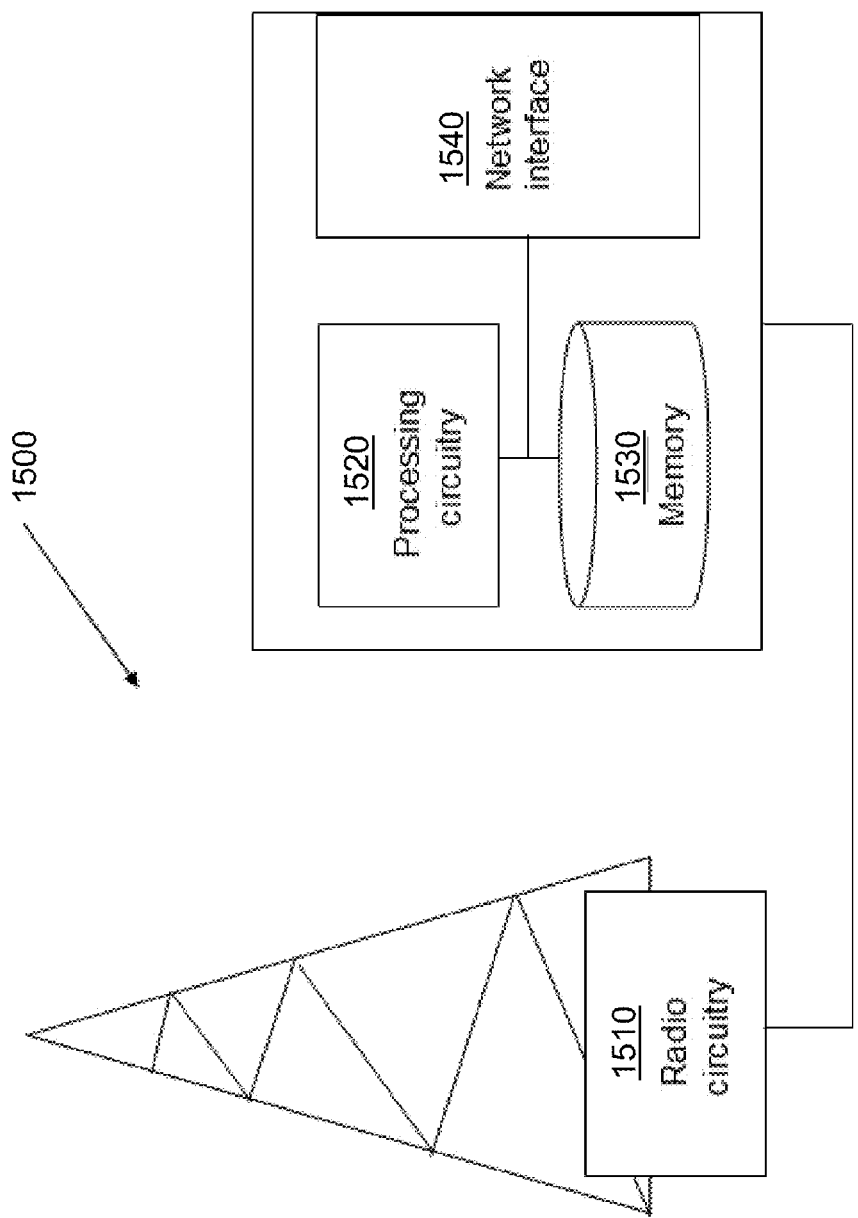
FIG. 15 is a block diagram showing an example network node.
Figure 16:
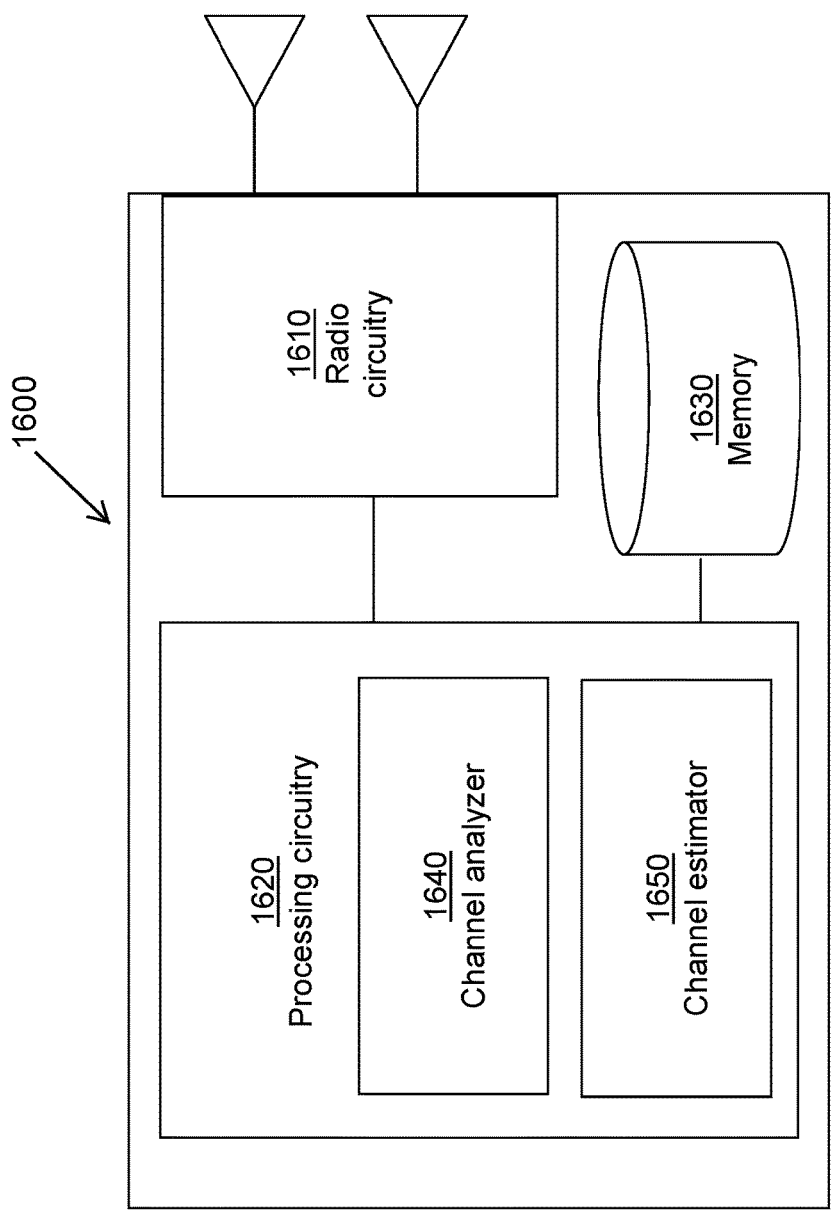
FIG. 16 is a block diagram showing an example wireless device.

Although the illustrated wireless device may represent a communication device that includes any suitable combination of hardware and/or software, this wireless device may, in particular embodiments, represent a device such as the example wireless device 1600 illustrated in greater detail by FIG. 16. Similarly, although the illustrated network nodes may represent network nodes that includes any suitable combination of hardware and/or software, these network nodes may, in particular embodiments, represent devices such as the example network node 1500 illustrated in greater detail by FIG. 15.

As shown in FIG. 16, the example wireless device 1600 includes processing circuitry 1620, a memory 1630, radio circuitry 1610, and at least one antenna. The radio circuitry may comprise RF circuitry and baseband processing circuitry (not shown). In particular embodiments, some or all of the functionality described above as being provided by mobile communication devices or other forms of wireless device may be provided by the processing circuitry 1620 executing instructions stored on a computer-readable medium, such as the memory 1630 shown in FIG. 16. Alternative embodiments of the wireless device 1600 may include additional components beyond those shown in FIG. 16 that may be responsible for providing certain aspects of the wireless device's functionality, including any of the functionality described above and/or any functionality necessary to support the solution described above.

Still with reference to FIG. 16, some embodiments provide a wireless device 1600 for performing channel estimation. The device comprises radio circuitry 1610 and processing circuitry 1620. The processing circuitry 1620 further comprises a channel analyzer 1640 and a channel estimator 1650.

The processing circuitry 1620 is configured to obtain an indication that a set of antenna ports, or antenna port types, share at least one channel property. In some variants, the processing circuitry 1620 is configured to obtain the indication by receiving a message via the radio circuitry 1610. In other variants, the processing circuitry 1620 is configured to determine the set of antenna ports or antenna port types based on a rule.

The channel analyzer 1640 is configured to estimate one or more of the shared channel properties based at least on a first reference signal transmitted from a first antenna port included in the set, or having a type corresponding to one of the types in the set, wherein the first reference signal is received via the radio circuitry 1610. The channel estimator 1650 is configured to perform channel estimation based on a second reference signal transmitted from a second antenna port included in the set, or having a type corresponding to one of the types in the set, wherein the channel estimation is performed using at least the estimated channel properties, and wherein the second reference signal is received via the radio circuitry 1610.

In some variants, the channel analyzer 1640 is configured to perform joint estimation of one or more of the shared channel properties, based on the second reference signal and one or more additional reference signals received from respective antenna ports included in the set, or having a type corresponding to one of the types in the set. The one or more additional reference signals may comprise the first reference signal.

In particular embodiments, the channel estimator 1650 is configured to generate an estimation filter based on the estimated channel properties, and to apply the estimation filter to the second reference signal to obtain a channel estimate. The channel estimator 1650 may be further configured to apply the estimation filter to at least one other reference signal received from an antenna port included in the set, or having a type corresponding to one of the types in the set, to obtain a second channel estimate.

In particular embodiments, the processing circuitry 1620 is further configured to receive an indication of one or more resource block groups across which the set of antenna ports or antenna port types share at least one channel property, and to estimate one or more channel properties over the indicated set of resource block groups.

In particular embodiments, the processing circuitry 1620 is further configured to receive an indication of a time interval during which the set of antenna ports or antenna port types share at least one channel property, and to estimate one or more channel properties during the indicated time interval, possibly by time-averaging.

As shown in FIG. 15, the example network node 1500 includes processing circuitry 1520, a memory 1530, radio circuitry 1510, and at least one antenna. The processing circuitry 1520 may comprise RF circuitry and baseband processing circuitry (not shown). In particular embodiments, some or all of the functionality described above as being provided by a mobile base station, a base station controller, a relay node, a NodeB, an enhanced NodeB, and/or any other type of mobile communications node may be provided by the processing circuitry 1520 executing instructions stored on a computer-readable medium, such as the memory 1530 shown in FIG. 15. Alternative embodiments of the network node 1500 may include additional components responsible for providing additional functionality, including any of the functionality identified above and/or any functionality necessary to support the solution described above.

Referring once more to the block diagram in FIG. 15, some embodiments provide a network node 1500 comprising radio circuitry 1510 and processing circuitry 1520. The processing circuitry 1520 is configured to obtain an indication that a set of antenna ports, or antenna port types, share at least one channel property. In some variants, the processing circuitry 1520 is configured to obtain the indication by determining that antenna ports transmitting reference signals that are code multiplexed using an orthogonal cover code are part of the same set. The antenna port types correspond to types of reference signals transmitted by the ports, and comprise one or more of: DMRS, CSI-RS, CRS.

The processing circuitry is further configured to transmit, via the radio circuitry 1510, at least two of the antenna ports in the set, or antenna ports having types comprised in the set, from the same transmission point.

In some variants, the processing circuitry 1520 is configured to transmit, via the radio circuitry 1510, an indication of the set of antenna ports, or antenna port types, to at least one wireless device served by the network node. The processing circuitry 1520 may be configured to transmit the indication in system information, in an RRC message, or in downlink control information.

In some variants, the indication further indicates one or more resource block groups across which the set of antenna ports or antenna port types share at least one channel property. The processing circuitry 1520 is then configured to transmit, via radio circuitry 1510, signals corresponding to at least two of the antenna ports in the set, or antenna ports having types comprised in the set, from the same set of transmission points over the indicated resource block groups.

In some variants, the indication further indicates a time interval during which the set of antenna ports or antenna port types share at least one channel property, and the processing circuitry 1520 is configured to transmit, via radio circuitry 1510, signals corresponding to at least two of the antenna ports in the set, or antenna ports having types comprised in the set, from the same set of transmission points during the indicated time interval.

Modifications and other variants of the described embodiments will come to mind to one skilled in the art having the benefit of the teachings presented in the foregoing descriptions and the associated drawings. Therefore, it is to be understood that the embodiments are not to be limited to the specific examples disclosed and that modifications and other variants are intended to be included within the scope of this disclosure. Although specific terms may be employed herein, they are used in a generic and descriptive sense only and not for purposes of limitation.

In particular, although various examples disclosed herein refer to a user equipment (UE), this shall not be construed as limiting. It should be appreciated that the methods and concepts apply to wireless devices in general. Furthermore, wherever examples herein refer to actions performed by "the network", in many implementations such actions will be performed by a network node, in particular a base station such as an eNB.

Throughout this disclosure, nodes or points in a network are often referred to as being of a certain type, e.g., "macro" or "pico". Unless explicitly stated otherwise, this should not be interpreted as an absolute quantification of the role of the node/point in the network but rather as a convenient way of discussing the roles of different nodes/points relative to each other. Thus, a discussion about macro and picos could for example just as well be applicable to the interaction between micros and femtos.

Note that although terminology from 3GPP LTE has been used herein to exemplify the disclosed concepts, this should not be seen as limiting the scope of this disclosure to only the aforementioned system. Other wireless systems, including WCDMA, WiMax, UMB and GSM, may also benefit from exploiting the ideas covered within this disclosure.

The word "comprise" or "comprising", as used herein, is intended to be interpreted as non-limiting, i.e., meaning "consist at least of".

The invention claimed is:

1. A method for channel estimation in a wireless device, the method comprising:
   determining a set of antenna ports, which share at least one channel property, wherein a first reference signal is conveyed over a first antenna port included in the set of antenna ports and a second reference signal is conveyed over a second antenna port included in the set of antenna ports;
   estimating one or more of the shared channel property or properties based at least on the first reference signal; and
   performing channel estimation based on the second reference signal,
   wherein the channel estimation based on the second reference signal is performed using at least the estimated one or more of the shared channel property or properties.

2. The method of claim 1, wherein the estimation of one or more of the shared channel properties is performed jointly, based on the first reference signal and the second reference signal.

3. The method of claim 1, wherein the step of performing channel estimation comprises:
   generating an estimation filter based on the estimated channel properties; and applying the estimation filter to the second reference signal to obtain a channel estimate.

4. The method of claim 3, further comprising applying the estimation filter to at least one other reference signal received from an antenna port included in the set to obtain a second channel estimate.

5. The method of claim 1, wherein the determined set of antenna ports is to be considered co-located.

6. The method of claim 1, wherein the set of antenna ports is determined based on a predefined co-location rule.

7. The method of claim 6, wherein the rule is encoded into a standard.

8. The method of claim 1, wherein the at least one channel property is one or more of: delay spread, Doppler spread, frame synchronization, and received timing.

9. The method of claim 1, wherein the at least one channel property is one or more of: signal-to-noise ratio, timing of first significant channel tap, and number of significant channel taps.

10. A wireless device for performing channel estimation, the device comprising radio circuitry and processing circuitry, the processing circuitry further comprising channel analyzer circuitry and channel estimator circuitry, wherein the processing circuitry is configured to:
    determine a set of antenna ports, which share at least one channel property, wherein a first reference signal is conveyed over a first antenna port included in the set of antenna ports and a second reference signal is conveyed over a second antenna port included in the set of antenna ports;
    estimate one or more of the shared channel properties based at least on the first reference signal, wherein the first reference signal is received via the radio circuitry; and
    perform the channel estimation based on the second reference signal, wherein the second reference signal is received via the radio circuitry,
    wherein the channel estimation based on the second reference signal is performed using at least the estimated one or more channel property or properties.

11. The wireless device of claim 10, wherein the processing circuitry is further configured to jointly estimate one or more of the shared channel properties based on the first reference signal and the second reference signal.

12. The wireless device of claim 10, wherein the processing circuitry is further configured to:
    generate an estimation filter based on the estimated channel properties; and
    apply the estimation filter to the second reference signal to obtain a channel estimate.

13. The wireless device of claim 12, wherein the processing circuitry is further configured to apply the estimation filter to at least one other reference signal received from an antenna port included in the set to obtain a second channel estimate.

14. The wireless device of claim 10, wherein the determined set of antenna ports is to be considered co-located.

15. The wireless device of claim 10, wherein processing circuitry is configured to determine the set of antenna ports based on a predefined co-location rule.

16. The wireless device of claim 15, wherein the rule is encoded into a standard.

17. The wireless device of claim 10, wherein the at least one channel property is one or more of: delay spread, Doppler spread, frame synchronization, and received timing.

18. The wireless device of claim 10, wherein the at least one channel property is one or more of: signal-to-noise ratio, timing of first significant channel tap, and number of significant channel taps.

19. A non-transitory computer-readable medium storing instructions which when executed by processor circuitry of a wireless device cause the wireless device to:
    determine a set of antenna ports, which share at least one channel property, wherein a first reference signal is conveyed over a first antenna port included in the set of antenna ports and a second reference signal is conveyed over a second antenna port included in the set of antenna ports;
    estimate one or more of the shared channel property or properties based at least on the first reference signal; and
    perform the channel estimation based on the second reference signal,
    wherein the channel estimation based on the second reference signal is performed using at least the estimated one or more of the shared channel property or properties.

* * * * *